United States Patent [19]
Racine et al.

[11] Patent Number: 5,445,184
[45] Date of Patent: Aug. 29, 1995

[54] MAGNETIC VALVE RESET MECHANISM

[76] Inventors: Raymond P. Racine, 6809 Town Harbor Blvd. Apt. #1912; Bert D. Malani, 6662 Boca Del Mar Dr. No. 711 Club Royale, both of Boca Raton, Fla. 33433

[21] Appl. No.: 312,519

[22] Filed: Sep. 26, 1994

[51] Int. Cl.⁶ .................................. F16K 17/20
[52] U.S. Cl. ........................... 137/460; 137/462; 251/65
[58] Field of Search ............... 137/460, 462; 251/65

[56] References Cited

U.S. PATENT DOCUMENTS

| | | | |
|---|---|---|---|
| 854,047 | 5/1907 | Leber | 137/462 |
| 2,229,893 | 1/1941 | Hubka | 137/462 |
| 4,195,658 | 4/1980 | Dierksmeier | 137/462 |
| 4,210,174 | 7/1980 | Eross | 251/65 X |
| 4,465,093 | 8/1984 | Gold et al. | 137/462 X |
| 4,574,833 | 3/1986 | Custer | 137/460 X |
| 4,637,427 | 1/1987 | Nolan et al. | 251/65 X |
| 4,880,030 | 11/1989 | Terry | 137/462 X |

*Primary Examiner*—Stephen M. Hepperle

[57] ABSTRACT

The present invention comprises of a reset mechanism particularly suited for use within magnetic valves. The reset mechanism will insure the desired return of a magnetic valve to its normal position even though there exists an imbalance of fluid pressure between the magnetic valve's inlet and outlet passages. The reset mechanism's principle of operation is the creation of a pressure differential across a reciprocating valve to return the valve to its normally open position in a snap action movement. After said magnetic valve has closed in response to a pre-determined excess of fluid pressure, thus blocking off communication between the inlet and outlet passages, a reset valve is actuated to establish a communication through a reset passage that creates a pressure differential that eliminates any opposition to and effectuates the immediate return of the magnetic valve to its normally open position in a snap action movement without having to equalize pressure across the magnetic valve.

3 Claims, 1 Drawing Sheet

MAGNETIC VALVE RESET MECHANISM

BACKGROUND OF THE INVENTION

The invention relates to magnetic valves and, in particular, it is an improvement in magnetic valves that insures the return of a magnetic valve to its normally open position after an occurrence of a condition that induces the closure of the magnetic valve. Magnetic valves have a crowded prior art and are exemplified by such patents as U.S. Pat. No. 3,200,214 to Aubert; U.S. Pat No. 2,869,563 to Schoengrun; and U.S. Pat. No. 3,360,107 to Haidek. Heretofore, the use of pressure equalization to allow the reset function is commonly used in many devices and for magnetic valves in particular it is embodied in U.S. Pat. No. 4,637,427 to Nolan. However, it is often impractical, time consuming, or undesirable to equalize pressure across a magnetic valve in many practical applications of magnetic valves in fluid systems. Additional system isolation valves that insure that the equalization of fluid pressure will occur in a reasonable amount of time are often required or parts of the fluid system must be fully or partially depressurized. The length of time necessary for pressure equalization to occur will vary to as long as several minutes in many applications. Though the U.S. Pat. No. 4,637,427 to Nolan states that "experimentation has found that the return of the piston valve to its normally open position can be insured only if the pressure differential between the inlet port and the outlet port is equalized", the present invention accomplishes said return of the piston valve without equalizing pressure between the inlet and outlet passages. The present invention improves upon the structure of the patents to Nolan and Aubert by providing a means to immediately reset a magnetic valve notwithstanding the existence of an imbalance of fluid pressure between the inlet and outlet passages of said magnetic valve.

SUMMARY OF THE INVENTION

The present invention comprises of a reset mechanism particularly suited for use within magnetic valves. The reset mechanism will insure the immediate return of a magnetic valve to its normal operating condition even though there exists an imbalance of fluid pressure between the magnetic valve's inlet and outlet passages. After a magnetic valve has closed in response to a predetermined level of fluid pressure, and thereby blocking off communication between the inlet and outlet passages of said magnetic valve, a reset mechanism can be actuated in order to eliminate any opposition to and effectuate the immediate return of the magnetic valve to its normally open condition in snap action movement.

It is the principle object of the present invention to improve the structure of a magnetic valve by providing a reset mechanism particularly suited to magnetic valves.

It is a further object to provide a magnetic valve with a reset mechanism that insures the immediate return of the magnetic valve to its normally open state as a snap action event, notwithstanding an excess of fluid pressure between the magnetic valve's inlet and outlet passages, where said excess fluid pressure acts to retain said magnet valve in its closed position.

It is a still further object of the present invention to provide a simple reset mechanism that ensures that the operating sequence of opening, closing and reopening of a magnetic valve in practical applications can be quickly accomplished.

It is still yet a further object of the present invention to provide a simple reset mechanism for magnetic valves that eliminates consideration of the necessity for additional requirements in a fluid system that enhance the ability to equalize pressure across a magnetic valve disposed in said fluid system, said additional requirements are often in the form of additional isolation or bleed valves.

The above objects and further objects and advantages of the present invention will become apparent from the herein set forth Detailed Description of the Invention, the Drawings and appended claims.

LIST OF REFERENCE NUMERALS

1. Inlet passage
2. Communication passage between the Inlet and Outlet passage.
3. Outlet passage.
4. Communication passage between the Reset passage and Outlet passage.
5. Communication passage between Reset passage and Inlet passage.
6. Chamber.
7. Reciprocating valve.
8. Control Screw.
9. End Plug.
10. Set Screw.
11. Reset Valve.
12. Reciprocating Valve Magnet.
13. Control Magnet.
14. Fixed Magnet.
15. Reset Valve Handle.
16. Magnetic Valve Housing.
17. Reset Passage.
18. Seating Surface.
19. Calibration Bias Mechanism

DETAILED DESCRIPTION OF THE INVENTION

Figure 1:
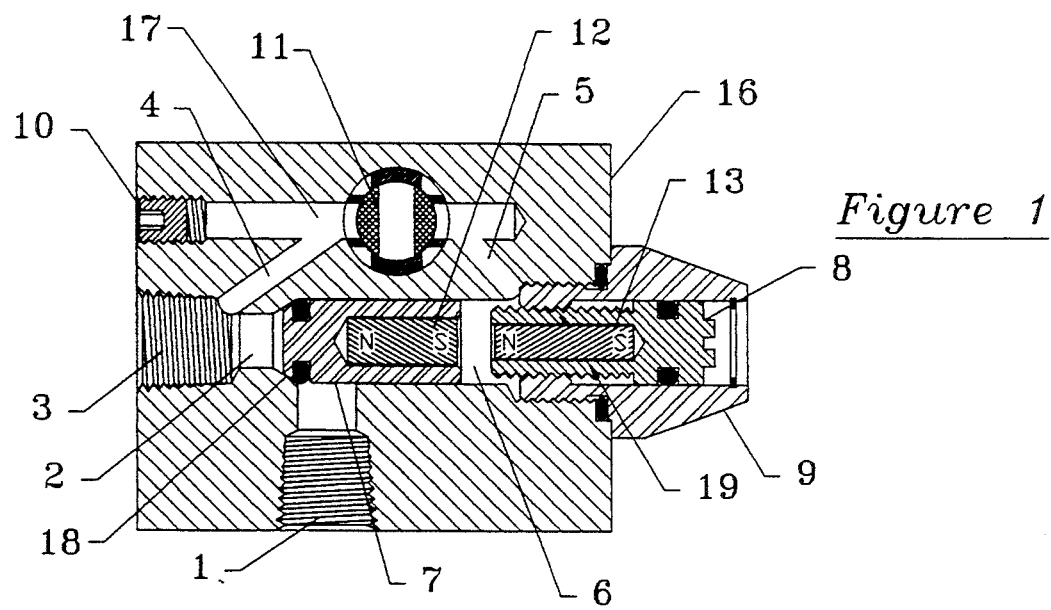
FIG. 1 is a vertical sectional view of an embodiment of the improved magnetic valve with the present invention, a reset mechanism. The magnetic valve is shown in a closed position.
Figure 2:
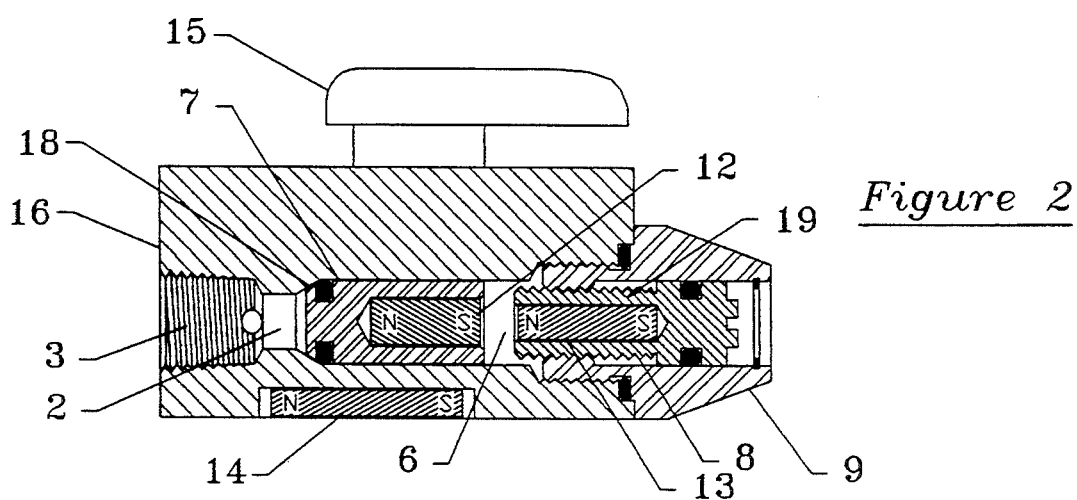
FIG. 2 is a top view of the magnetic valve in a closed position.
Figure 3:
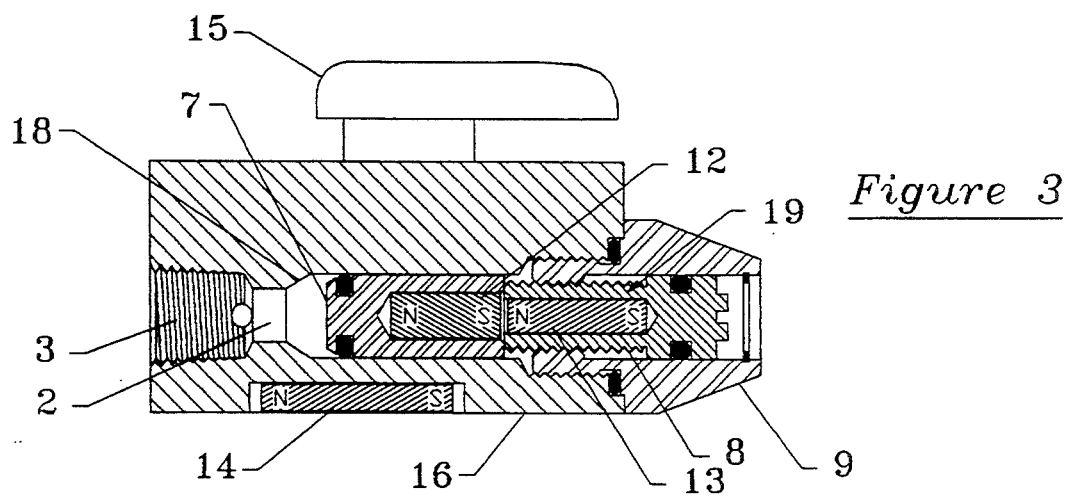
FIG. 3 is another top view of the magnetic valve in its normally open position.

In reference to FIG. 1 there is shown a magnetic valve embodied as an excess flow control device. This magnetic valve includes, a housing 16, an inlet passage 1, an outlet passage 3 in communication with said inlet passage through area 2, a reciprocating valve 7 comprising a ferromagnetic armature capable of receiving an axis of magnetic polarity co-linear with its axis of reciprocation, a chamber 6 permitting longitudinal movement of said reciprocating valve along said axis of magnetic polarity, a reset passageway 17, a reset valve 11, and a calibration bias mechanism 19. The calibration and bias mechanism in the current embodiment includes a control screw 8 disposed with the housing 16, and a control, pole magnet 13 disposed within said control screw. The diameter of the chamber 6 is slightly larger than the diameter of the reciprocating valve 7 so that the reciprocating valve may freely slide within said chamber without impediment, moreover, there exists a fluid constrictive flow path between the reciprocating valve and the chamber walls.

The reciprocating valve 7 normally permits communication between the inlet 1 and outlet 2 passageways through area 2. The reciprocating valve is magnetically biased by a pole magnet 12 encapsulated within the reciprocating valve. A second, control magnetic 13 is disposed within a control screw and a third fixed pole magnet 14 is disposed within the magnetic valve's housing in order to exert a magnetic influence upon the reciprocating valve to maintain said reciprocating valve in its normally open position and to return the reciprocating magnet to its normally open position from its closed position. The desired magnetic influences are obtained when the control magnet 13 attracts the reciprocating magnet 12, and the fixed magnet 14 repels said reciprocating magnet. The axial position of the reciprocating valve 7, in its normally open position within the longitudinal chamber 6, is determined by the control screw 8. In the current embodiment the front radial face of the reciprocating valve is grooved to contain an o-ring particularly adapted to completely interrupt communication between the inlet and the outlet passageways when the reciprocating valve moves to its closed position against a seating surface 18 disposed within the magnetic valve's housing. The seating of the reciprocating valve and creating a fluid fight blockage of the passage is otherwise known as creating a positive seal closure.

An occurrence of excess fluid flow through the area of communication 2 between the inlet 1 and outlet 2 passageways creates a relative vacuum in said area 2, believed to be a result of the Venturi Effect, that generates a pull across the front radial face of the reciprocating valve. An excess of fluid flow beyond a predetermined level produces a relative vacuum sufficient to overcome the magnetic influences between the reciprocating valve 7, the control magnet 13, and the fixed magnet 14 resulting in the reciprocating valve sliding towards the seating surface 18. The movement of the reciprocating valve has the desired effect of enhancing the relative vacuum in area 2, resulting in an increasingly stronger pull across the front radial face of the reciprocating valve, and thereby creating a snap action movement of the reciprocating valve from its normally open position to its closed position. The positioning of the reciprocating valve in its closed position creates a positive seal closure between the inlet passage 1 and the outlet passage 2.

If after closing the fluid pressure in volumetric area 6 is equal to, or less than the fluid pressure in the volumetric region 2 the magnetic influences of a repulsion from the fixed magnet 14 and an attraction from the control magnet 13 are sufficient to return the reciprocating valve to its normally open position. If after closing the fluid pressure in the volumetric area 6 behind the rear radial face of the reciprocating valve exceeds the fluid pressure in volumetric area 2 there exists a pressure differential across the reciprocating valve that insures the reciprocating valve remains in its closed position and maintains a positive seal closure. In this case, the repositioning of the reciprocating valve, to its normally open position, has in practice been difficult as said pressure differential has a tendency to exist in many practical applications of magnetic valves, notwithstanding the elimination of the original excess of fluid pressure that caused the valve closure. A common, but lengthy, remedy is to equalize upstream and downstream pressure across the magnetic valve by means of a bypass external to, or internally disposed within the housing of the magnetic valve. The improvement of the present invention accomplishes the objective of an immediate return of the reciprocating valve to its normally open position in a snap action event despite the existence of a pressure differential across the magnetic valve.

The present invention accomplishes the reset function by the provision of a reset passageway 17 that creates a fluid communication between the volumetric area 6 behind the rear radial face of the reciprocating valve and the outlet passageway 3 of the magnetic valve. A reset valve 11 normally interrupts said communication in order to permit the normal operation of the magnetic valve. In circumstances where the return of the reciprocating valve to its normally open position following its closure is prohibited by the existence of an excess of fluid pressure on the rear radial face of the reciprocating valve, use is made of the actuation means of the reset valve (by any means electromechanical) to open the reset passageway 17 and thereby allowing fluid communication between the volumetric area 6 behind the rear radial face of the reciprocating valve and the outlet passageway 3. An immediate consequence of establishing said fluid communication, is the release of excess fluid pressure in volumetric area 6 behind the rear radial face of the reciprocating valve, thereby removing any opposition to the return of the reciprocating valve to its normally open position. A second consequence is the commencement of a fluid flow through the inlet passageway 1 and then through the clearance tight volumetric area between the reciprocating valve and the chamber in which it slides. The fluid flow produces a pressure drop across the reciprocating valve, as the diameter of the chamber is only slightly larger than the diameter of the reciprocating valve, this pressure differential acts to immediately return the reciprocating valve 7 to its normally open position adjacent to the calibration and bias mechanism 19 in a snap action movement, at which point the bypass valve is actuated to isolate the bypass passage and the magnetic valve is fully reset to a normally open operating condition.

While there have been herein shown and described the preferred embodiments of the present invention, it is evident that the invention may be embodied otherwise than as herein illustrated and described. Certain changes in the construction and detail, and in the form and arrangement of the parts may be made without departing from the underlying ideas or principles of this invention, within the scope of the appended claims.

Having described our invention, what we claim as new, useful and non-obvious and accordingly, secured by Letters Patent of the United States, is:

1. A fluid control valve with re-set mechanism, the valve including a housing, a fluid inlet passage, a fluid outlet passage in communication with said fluid inlet passage, said fluid control device comprising:
(a) a reciprocating valve capable of permitting, limiting, or precluding communication between said inlet and outlet passages, said reciprocating valve comprising a ferromagnetic armature defining a magnetic axis co-linear with its axis of reciprocation, said axis corresponding to the longitudinal center of a fluid tight chamber within said housing wherein said valve may reciprocate, said valve having a variable flow responsive integral radial end face disposed within a region of communication between said inlet and outlet passages, said outlet passage having an entrance complemental to the geometry of said first end face;

(b) a reset channel disposed in said housing; allowing communication between a volumetric area of said chamber adjacent to the second radial end face of said reciprocating valve and the said outlet passageway;

(c) an externally actuated reset valve normally preventing communication through said reset channel; and (d) a magnetic bias and calibration means disposed within said housing and normally in contact with said reciprocating valve, near the radial end opposite to said flow-responsive radial end of said valve, said bias and calibration mechanism is provided with an axis of magnetic polarity essentially co-linear with said valve exerting a magnetic influence attracting said reciprocating valve; whereby, resetting said reciprocating valve to its normally open position, even though there exists an excess of fluid pressure retaining said valve in its closed position, is accomplished by actuating the reset valve and allowing communication between the volumetric area of the fluid tight chamber adjacent to the rear radial end face of the reciprocating piston closest to the calibration and bias mechanism and the outlet passage, and thereby, relieving said excess fluid pressure, and thus eliminating opposition to the return of the reciprocating valve to its normally open position, and creating a pressure differential between the inlet passage and said volumetric area of the fluid tight chamber, said pressure differential immediately effectuating the return of said reciprocating valve to its normally open position in a snap action movement without equalizing fluid pressure between the inlet and outlet passages.

2. The valve as recited as in claim 1 in which said port face of said reciprocating valve further comprises sealing means for accomplishing a fluid-tight nesting of said port face against said complemental geometry of the entrance to said outlet passage during closure of said valve.

3. The valve as recited as in claim 1 in which a fixed pole magnet is disposed within the valve housing, said fixed pole magnet having a magnetic axis disposed to exert a magnetic influence substantially along the magnetic axis of said reciprocating valve to normally repel said reciprocating valve toward its open direction when said reciprocating valve is closed.

* * * * *